(12) United States Patent
Wang

(10) Patent No.: US 7,068,523 B2
(45) Date of Patent: Jun. 27, 2006

(54) PARALLEL FEED-FORWARD COMPENSATING TYPE POWER FACTOR CORRECTION CIRCUIT FOR A THREE-PHASE POWER SOURCE

(76) Inventor: Yufu Wang, No. 35, East Qinghua Road, Haidian District, Beijing (CN) 100083

( * ) Notice: Subject to any disclaimer, the term of this patent is extended or adjusted under 35 U.S.C. 154(b) by 66 days.

(21) Appl. No.: 10/496,177

(22) PCT Filed: Nov. 19, 2002

(86) PCT No.: PCT/CN02/00828

§ 371 (c)(1),
(2), (4) Date: May 18, 2004

(87) PCT Pub. No.: WO03/044933

PCT Pub. Date: May 30, 2003

(65) Prior Publication Data

US 2005/0013146 A1    Jan. 20, 2005

(30) Foreign Application Priority Data

Nov. 20, 2001 (CN) .............................. 01 1 40014

(51) Int. Cl.
H02H 7/122 (2006.01)
(52) U.S. Cl. ........................... 363/56; 363/44; 363/89; 323/222; 323/225
(58) Field of Classification Search ............ 363/34–41, 363/124, 44–48, 89, 87, 127; 323/222, 299, 323/300, 303
See application file for complete search history.

(56) References Cited

U.S. PATENT DOCUMENTS

| 4,384,321 A | * | 5/1983 | Rippel ........................ 363/124 |
| 5,886,891 A | | 3/1999 | Jiang et al. ................... 363/84 |
| 6,043,997 A | | 3/2000 | He et al. ...................... 363/44 |

FOREIGN PATENT DOCUMENTS

| CN | 1057174 C | 10/2000 |
| CN | 1317859 | 10/2001 |
| JP | 10-201236 | 7/1998 |

* cited by examiner

Primary Examiner—Rajnikant B. Patel
(74) Attorney, Agent, or Firm—Westman, Champlin & Kelly, P.A.

(57) ABSTRACT

A parallel feed-forward compensation type three-phase power factor correction circuit for a three-phase power supply comprises a primary rectifying circuit I, and a feed-forward compensation circuit II which is in parallel with the primary rectifying circuit I. The primary bridge rectifier circuit I comprises a three-phase bridge and a filter capacitor. The feed-forward compensation circuit II comprises a plurality of bi-direction switches, a rectifying circuit, a boost converter, an output current sampler and a control circuit. In the corresponding phase interval the feed-forward compensation circuit sequentially closes the phase of that whose absolute value of the voltage is the higher one of the two phases at same polarity. The other two phases are rectified by bridge rectifying circuit and forced to export a compulsive current waveform. In this configuration, it can amend the current waveform of each phase, reduce harmonic distortion and improve the efficiency of the power supply with very little power.

4 Claims, 2 Drawing Sheets

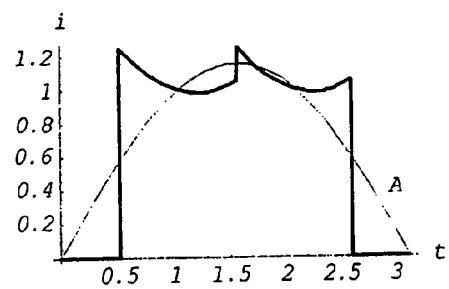
Fig.9
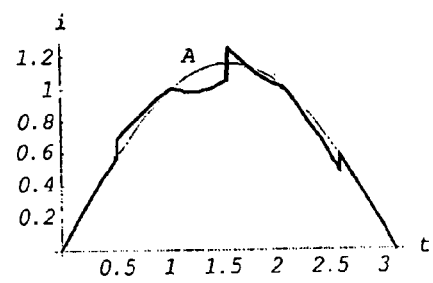
Fig.10
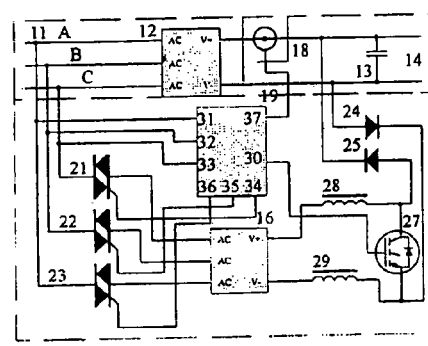
Fig.11
Fig.12

US 7,068,523 B2

PARALLEL FEED-FORWARD COMPENSATING TYPE POWER FACTOR CORRECTION CIRCUIT FOR A THREE-PHASE POWER SOURCE

CROSS-REFERENCE TO RELATED APPLICATION

This Application is a Section 371 National Stage Application of International Application No. PCT/CN02/00828, filed Nov. 19, 2002 and published as WO 03/044933 on May 30, 2003, which is based upon Chinese Application No. 01140014.5, the contents of which are hereby incorporated by reference in their entirety.

FIELD OF THE INVENTION

The present invention relates, in general, to three-phase active power factor correction (APFC), more specifically, to a parallel, feed-forward and compensation three-phase APFC.

BACKGROUND OF THE INVENTION

U.S. Pat. No. 006,043,997A disclosed a two stage, three-phase power boost factor correction circuit comprising a primary rectifier and a primary boost switch. The correction circuit is coupled between an input of three-phase power supply and an output of a three-phase boost converter. In the three-phase boost converter, a method of reducing input current total harmonic distortion (THD) at the input of the three-phase boost converter is to use an auxiliary stage including first, second and third pair auxiliary boost inductors coupled to corresponding inputs of the three phase power supply and the primary rectifier. The auxiliary stage also includes an auxiliary boost switch interposed between the first, second and third auxiliary boost inductors and the output so as to draw corresponding phase currents through the first, second and third auxiliary boost inductors, and thereby reducing input current THD at the input of the three-phase boost converter. The circuit has to process the whole power of the power supply, so that the efficiency is reduced and the cost is high.

SUMMARY OF THE INVENTION

It is an object of the present invention to provide a parallel feed-forward and compensation three-phase active power factor correction (APFC) circuit, which can operate selectively so as to meet the needs of low cost and high efficiency, while reducing input current total harmonic distortion (THD).

In the present invention, an auxiliary compensation circuit II, which is referred to as an auxiliary compensation circuit II hereinafter, is in parallel with the common three-phase rectifier I.

The primary rectifying circuit I comprises a three-phase bridge rectifier 12 and a filter capacitor 13, the feed-forward compensation circuit II comprises a plurality of bi-direction switches 15, a rectifier 16, a boost converter 17, an output current sampler 18 and a control circuit 19. As shown in FIG. 2, the feed-forward compensation circuit II works in such a way that, a whole period of three-phase is divided into 12 parts, the control circuit 19 makes the bi-direction switches 15 cut off the phase C in a-b interval, the phase A in b-c interval, the phase B in c-d interval, the phase C in d-e interval, the phase A in e-f interval, the phase B in f-g interval, the phase C in g-h . . . . That is for the two phases at same polarity, the phase with higher absolute value is cut off by the bi-direction switches 15, then the phase with lower absolute value is forced to conduct to the third phase, such as the phase A with phase B in a-b interval, the phase C with phase B in b-c interval, the phase C with phase A in c-d interval, the phase B with phase A in d-e interval, the phase B with phase C in e-f interval, the phase A with phase C in f-g interval, the phase A with phase B in g-h . . . , so as to generate a DC voltage through the rectifier 16 of the feed-forward compensation circuit II. Then the boost converter 17 forces the output DC current of rectifier 16 to inject into the output 14 of the primary three-phase bridge rectifier 12. In other words, in turns of 12 steps in each of 12 intervals of a whole three-phase line period, the feed-forward compensation circuit II forces the phase with lower absolute value of the two phases having same polarity to conduct with the phase at the opposite polarity by cutting off the phase with higher absolute value, and rectifies and boosts a DC current with suitable waveform which is then injected into the output 14 of the primary three-phase rectifier 12.

The feed-forward compensation circuit II in parallel with the primary rectifier circuit I is used in present invention, so the THD is decreased greatly. It can produce a compulsive current waveform (for example the sine waveform of ±π/6 shown in FIG. 3 and FIG. 4) in ±π/6 interval across zero of each of the three phases, in which the phase is not conducted without application of this circuit. After the compulsive process of this circuit, the waveform of voltage in the primary rectifier circuit does not change, and the output waveforms of the current and the voltage do not change too. For instance, in the b-c interval the feed-forward compensation circuit II cuts off the phase A which is at same polarity with phase C but has higher absolute value, so the phase C and B are rectified by rectifier 16. The compulsive current waveform by boost converter 17 is shown in FIG. 3, the sine current waveform in the interval of 5π/6 to π, which is in proportion to the output current, is boosted and injected into the output of the primary three-phase rectifier 14. In this interval, the phase B, at the opposite polarity, conducts with both phase A and phase C through the primary and the auxiliary rectifies respectively, so that its input current will be maintained as it was before. The phase C has no current through the primary bridge rectifier circuit, its current forced by the feed-forward compensation circuit II will cut down the current of phase A being at same polarity. The working principles of the rest 11 intervals are the same as it. It is because that, the feed-forward compensation circuit II is not only to give out the current with suitable waveform in its current gap between ±π/6 phase interval, but also cut down the current of the phase with higher absolute value. As a result, neither the waveform of the output voltage and current of the rectifying circuit nor the waveforms of the phases having different polarity changes, of the two phases at same polarity, the lower one has a suitable waveform and the current of the higher one is decreased. That is the reason that the input current total harmonic distortion (THD) can be reduced thoroughly with very high efficiency.

BRIEF DESCRIPTION OF THE DRAWINGS

For a more complete understanding of the present invention, reference is now made to the following descriptions taken in conjunction with the accompanying drawings, in which:

FIG. 9 and FIG. 10 illustrate the phase current waveforms with and without APFC, that normalized filter capacitance is 0.2 (by phase peak voltage and output power, period is $2\pi$)

FIG. 11 and FIG. 12 illustrate two embodiment of the invention.

DETAILED DESCRIPTION OF THE EMBODIMENTS

Figure 1:
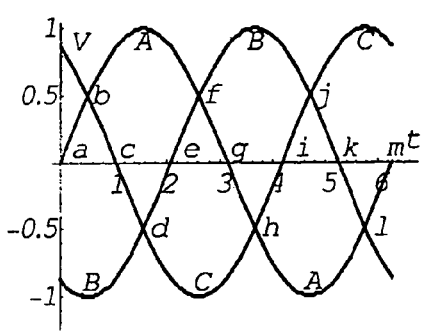
FIG. 1 illustrates the phase relationship of common three-phase main line power supply.

Referring initially to FIG. 1, illustrated is the phase relationship of common three-phase main line power supply.

Figure 2:
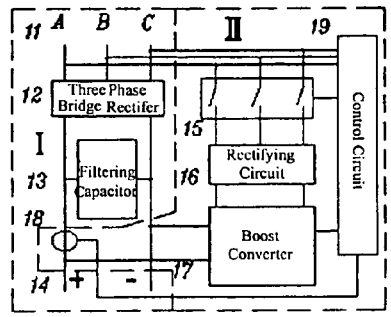
FIG. 2 illustrates a schematic diagram of the invention.
Figure 3:
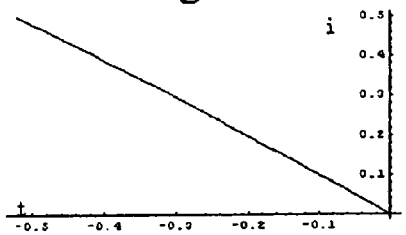
FIG. 3 and FIG. 4 illustrate a possible current waveforms selected to be forced by boost converter.
Figure 4:
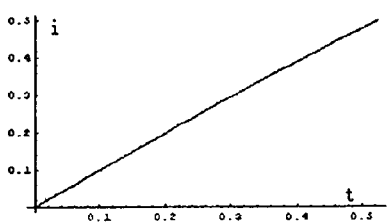

FIG. 2 is a schematic diagram of the present invention. In one embodiment, a primary rectifying circuit I and a feed-forward compensation circuit II are parallel. The primary rectifying circuit I comprises a three-phase bridge rectifier 12 and a filter capacitor 13. A three-phase power supply 11 is connected to the inputs of the three-phase bridge rectifier 12 of the primary rectifying circuit I. The outputs of the three-phase bridge rectifier 12 are connected to the filter capacitor 13. The feed-forward compensation circuit II comprises a plurality of bi-direction switches 15, a rectifier 16, a boost converter 17, an output current sampler 18 and a control circuit 19. The inputs of the bi-direction switches 15 of the feed-forward compensation circuit II are connected to the three-phase power supply 11 of the primary rectifying circuit I. The outputs of the bi-direction switches 15 are connected to the inputs of the rectifier 16. The outputs of the rectifier 16 are connected to the boost converter 17. The control circuit 19 is connected to the three-phase power supply 11, one terminal of the output current sampler 18, the bi-direction switches 15 and the boost converter 17. The other terminal of the output current sampler 18 is connected to the outputs 14. As far as the current gaps between $\pm\pi/6$ interval in the primary rectifier I is concerned, in the 12 steps in the feed-forward compensation circuit II the control circuit 19 makes the bi-direction switches 15 cut off the control circuit 19, makes the bi-direction switches 15 cut off the phase C in a-b interval, the phase A in b-c interval, the phase B in c-d interval, the phase C in d-e interval, the phase A in e-f interval, the phase B in f-g interval, the phase C in g-h .... That is for the two phases at same polarity, the phase with higher absolute value is cut off by the bi-direction switches 15, then the phase with lower absolute value is forced to conduct to the third phase, such as the phase A with phase B in a-b interval, the phase C with phase B in b-c interval, the phase C with phase A in c-d interval, the phase B with phase A in d-e interval, the phase B with phase C in e-f interval, the phase A with phase C in f-g interval, the phase A with phase B in g-h . . . , so as to generate a DC voltage through the rectifier 16 of the feed-forward compensation circuit II. Then the boost converter 17 forces the output DC current of rectifier 16 to inject into the output 14 of the primary three-phase bridge rectifier 12, and make the phase have a current with suitable waveform. In such a way, for instance in the b-c interval shown in FIG. 1, the phase C has suitable current waveform in its current gap, the current of phase A is decreased and its waveform becomes more close to sine waveform, only the input current of phase B is maintained as it was. The method processes only a small part of the whole power, but can make the current waveforms much better and decrease the THD greatly.

The effect of the feed-forward compensation circuit II to decrease the THD is illustrated from FIG. 5 to FIG. 10.

Figure 5:
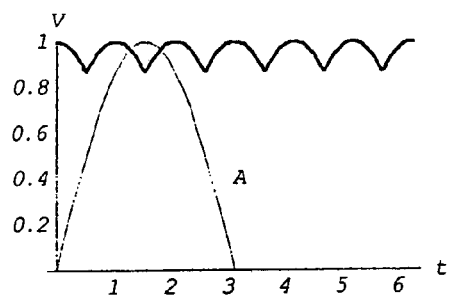
FIG. 5 and FIG. 6 illustrate the output voltage and current waveforms of a three-phase low filter capacitor rectifier with constant power load, which are normalized by the magnitude of phase peak voltage and output power.
Figure 6:
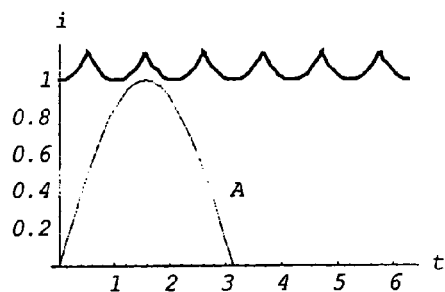

The common voltage waveform of the output of a three-phase bridge rectifier is shown in FIG. 5, and the current waveform is shown in FIG. 6 if the load is constant.

Figure 7:
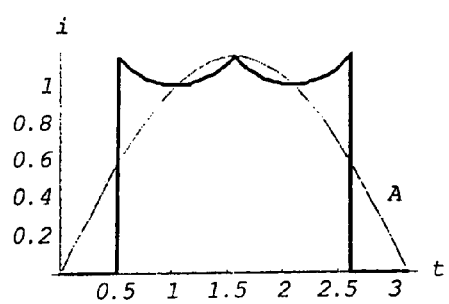
FIG. 7 and FIG. 8 illustrate the phase current waveforms with and without APFC, that the filter capacitance is negligible.

FIG. 7 shows the phase current waveform, without feed-forward compensation circuit II and the filter capacitance is negligible, the THD is obviously.

Figure 8:
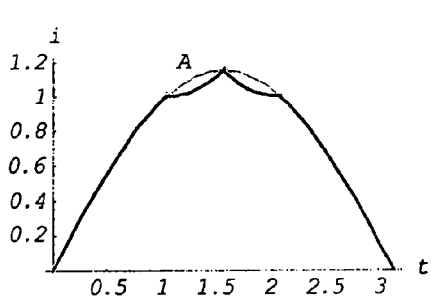

FIG. 8 shows the phase current waveform, with feed-forward compensation circuit II and the filter capacitance is negligible, the THD is decreased.

FIG. 9 shows the phase current waveform, without feed-forward compensation circuit II and the filter capacitance is not negligible, the THD is obviously.

FIG. 10 shows the phase current waveform, with feed-forward compensation circuit II and the filter capacitance is not negligible, the THD is decreased.

In the Figures above, the curves A is a sine to compare and all of the current waveforms are normalized by the output power.

As the first embodiment of the invention, in the FIG. 11 the primary rectifying circuit I and the feed-forward compensation circuit II are parallel. The primary rectifying circuit I is a common three-phase rectifying circuit comprising a three-phase bridge rectifier 12 and a filter capacitor 13. In the feed-forward compensation circuit II, the bi-direction switches 15 are TRIACs 21, 22, 23, the rectifying circuit is a rectifier 16, a boost converter 17 comprises boost inductors 28, 29, high frequency diodes 24, 25 and switching transistor 27 as a switching unit. Also an output current sampler 18 and a control circuit 19 are included.

The phases A, B and C of three-phase power supply 11 are connected to the inputs of the three-phase bridge rectifier 12. The outputs of the three-phase bridge rectifier 12 are connected to the outputs 14 paralleled with the filter capacitor 13. The inputs of TRIACs 21, 22, 23 of the feed-forward compensation circuit II are connected to the phases A, B and C of three-phase power supply 11 and their outputs are connected to the inputs of the rectifier 16. The outputs of the rectifier 16 are connected to the boost inductors 28, 29. The outputs of the boost inductors 28, 29 are connected to the positive terminal of the diode 25 and negative terminal of the diode 24. The negative terminal of the diode 25 is connected to the positive terminal of the output 14, and the positive terminal of diode 24 to the negative terminal of the output 14. The outputs of the boost inductors 28, 29 are respectively connected to the collector and emitter of the switching transistor 27 also. In the feed-forward compensation circuit II, the control circuit 19 comprises a toggle circuit 30, three phase detectors 31, 32, 33, three TRIAC control terminals 34, 35, 36 and an output current detect terminal 37. The toggle circuit 30 is connected to the gate of the switching transistor 27. Three phase detectors 31, 32, 33 are connected to the phases A, B and C of three-phase power supply. Three TRIAC control terminals 34, 35, 36 are connected to the control terminals of three TRIACs 21, 22, 23, and the current detect terminal 37 is connected to one terminal of the output current sampler 18. The other terminal of the output current sampler 18 is connected to the positive polarity of the output 14. The control circuit 19 get the magnitude of the output current through the output current sampler 18 to determine the magnitude of the output current of the boost converter 17.

The control circuit 19 of the feed-forward compensation circuit II gets the information of the phase from input of the three-phase power supply 11, to turn off the TRIAC 21 and cut off the phase C in a-b interval so that phase A and phase B are rectified to supply a DC voltage through rectifier 16 and feed it into the boost converter 17, to turn off the TRIAC 23 and cut off the phase A in b-c interval so that phase C and phase B are rectified to supply a DC voltage through rectifier 16 and feed it into the boost converter 17, to turn off the TRIAC 22 and cut off the phase B in c-d interval so that phase A and phase C are rectified to supply a DC voltage through rectifier 16 and feed it into the boost converter 17 . . . , to turn off the TRIAC 22 and cut off the phase B in l-m interval shown in FIG. 1 so that phase A and phase C are rectified to supply a DC voltage through rectifier 16 and feed it into the boost converter 17. By repeating above steps, the information of the phase determines the current phase of the boost converter 17 also. That is for the two phases at same polarity, the phase with higher absolute value is cut off, then the rest phases are rectified by rectifier 16 and the boost converter 17 outputs suitable compulsive current waveform.

By the way, in each phase interval, only one of the inductors 28, 29 works in boost state, the voltage cross the other is zero. They change their states at the points a, c, e, g, i, k, m shown in the FIG. 1, the compulsive current is just zero at these points. And they do not change their states at the points b, d, f, h, j, l shown in the FIG. 1, the inductor in the boost state series with the TRIAC need to be turned off and turned on, it makes the TRIAC turn off easy.

The second embodiment of the invention shown in FIG. 12 has almost the same principle with the one above described. In the FIG. 12 a primary rectifying circuit I and a feed-forward compensation circuit II are parallel. The primary rectifying circuit I is a common three-phase rectifying circuit comprising a three-phase bridge rectifier 12 and a filter capacitor 13. In the feed-forward compensation circuit II, bi-direction switches 15 are TRIACs 21, 22, 23, rectifying circuit is rectifier 16, boost converter 17 is a fly-back insulated converter comprising a IGBT27, a transformer 28, a diode 26. And also an output current sampler 18 and a control circuit 19 are included.

The phases A, B and C of three-phase power supply 11 are connected to the inputs of the three-phase bridge rectifier 12, the outputs of the three-phase bridge rectifier 12 are connected to the outputs 14 paralleled with the filter capacitor 13. The inputs of TRIACs 21, 22, 23 of the feed-forward compensation circuit II are connected to the phases A, B and C of the three-phase power supply 11. The outputs of the TRIACs 21, 22, 23 are connected to the inputs of the rectifier 16, the positive output of the rectifier 16 is connected to one terminal of the first coil of the transformer 28. The other terminal of the first coil of the transformer 28 is connected to the collector of the boost IGBT. Then the emitter of the boost IGBT is connected to the negative terminal of the rectifier 16. The negative terminal of the diode 26 is connected to positive terminal of the output 14. And positive terminal of the diode 26 is connected to one terminal of the second coil of the transformer 28. The other terminal of the second coil of the transformer 28 is connected to the negative terminal of the output 14. The control circuit 19 comprises a toggle circuit 30, three-phase detectors 31, 32, 33, three TRIAC control terminals 34, 35, 36 and an output current detect terminal 37. The toggle circuit 30 is connected to the gate of the switching transistor 27. The three phase detectors 31, 32, 33 are connected to three phases A, B and C of three-phase power supply 11. Three TRIAC control terminals 34, 35, 36 are connected to the control terminals of the three TRIACs 21, 22, 23 respectively, and the current detect terminal 37 is connected to one terminal of an output current sampler 18. The other terminal of the output current sampler 18 is connected to the positive terminal of the output 14. The control circuit 19 gets the magnitude of the output current through output current sampler 18 to determine the magnitude of the output current of the boost converter 17.

Although the present invention has been described in some details, those skilled in the art should understand that they can make various changes, for example, other forms of bi-direction switches 15, rectifier 16, boost converter 17, output current sampler 18, control circuit 19, substitutions and alterations herein without departing from the spirit and scope of the invention in its broadest form.

What is claimed is:

1. A parallel, feed-forward and compensation three-phase active power factor correction circuit comprising a primary rectifier circuit I having a three-phase bridge and a filter capacitor, and an feed-forward compensation circuit II, it is characterized in that the feed-forward compensation circuit II works in such a way that a whole period of three-phase is divided into 12 steps and comprises:
   a plurality of bi-direction switches;
   a control circuit which causes said bi-direction switches in turns cut off the higher one of the two phases which are at the same polarity during the corresponding interval of the whole period, and turn on the lower one and the phase at the opposite polarity;
   a rectifier circuit which rectifies the lower one and the phase at the opposite polarity to supply a DC voltage; and
   a boost converter which boosts the DC voltage and controls current waveform of the boosted DC voltage, and then injects it into an output of said three-phase bridge.

2. The parallel, feed-forward and compensation three-phase active power factor correction circuit as recited in claim 1, wherein the feed-forward compensation circuit II further comprises an output current sampler, the three-phase power supply are connected with the inputs of said three-phase bridge of said primary rectifier circuit I; the outputs of said three-phase bridge are connected with said filter capacitor; the inputs of said bi-direction switches of said feed-forward compensation circuit II are connected with the three-phase power supply of said primary rectifier circuit I; the outputs of said bi-direction switches are connected with the inputs of said rectifier circuit; the outputs of said rectifier circuit are connected with said boost converter; said control circuit is connected with the three-phase power supply, said boost converter and one terminal of said output current sampler respectively; the other terminal of said output current sampler is connected with the outputs; during each corresponding interval of the whole period, with respect to the interval in which a phase is in a phase interval from $-\pi/6$ to 0 or 0 to $\pi/6$ and is blocked off in said primary rectifier circuit I, said bi-direction switches of said feed-forward compensation circuit II cut off the phase C in a-b interval, the phase A in b-c interval, the phase B in c-d interval, the phase C in d-e interval, the phase A in e-f interval, the phase B in f-g interval and the phase C in g-h interval, . . . ; that is said feed-forward compensation circuit II cuts off the higher one of the two phases which are at same polarity in the corresponding intervals; it makes phase A and B in a-b interval, phase C and B in b-c interval, phase C and A in c-d interval, phase B and A in d-e interval, phase B and C in e-f interval, phase A and C in f-g interval and phase A and B in g-h interval supply a DC voltage through said rectifier circuit of said feed-forward compensation circuit II, whose current waveform then is verified by said boost converter and injected into the output of said primary rectifier circuit I.

3. The parallel, feed-forward and compensation three-phase active power factor correction circuit as recited in claim 2, wherein said bi-direction switches of the feed-forward compensation circuit II are bi-direction TRIACs, or GTOs, IGBTs etc. electronic components; the rectifier circuit is a bridge rectifier; said boost converter comprises two boost inductors, high frequency rectifier diodes, and switching transistors as a switching unit; the phases A, B and C are connected with the inputs of said three-phase bridge; the positive and negative output terminals of said three-phase bridge are in parallel with the filter capacitor and then connected to the outputs; the three inputs of said bi-direction TRIACs in said feed-forward compensation circuit II are connected to the phases A, B and C separately, and their three outputs are connected to the inputs of said bridge rectifier of said feed-forward compensation circuit II; their positive and negative output terminals are connected to said two boost inductors, and the outputs of said inductors are separately connected to the positive terminal of one of said diodes and the negative terminal of the other one; the rest negative terminal of the one is connected to the positive output terminal, and the positive terminal of the other one is connected to the negative output terminal; at the same time, the outputs of said two boost inductors are connected to the collector and emitter of said switching transistors; said control circuit of said feed-forward compensation circuit II comprises a toggle circuit, three phase detect terminals, three control terminals of bi-direction switches and an output current detect terminal; said toggle circuit is connected to the gate of said switching transistor; said three phase detect terminals are connected with phases A, B and C of the three-phase power supply; said three control terminals of said bi-direction switches are connected with said three control terminals of said bi-direction TRIACs; said output current detect terminal of said control circuit is connected with one terminal of said output current sampler; the other terminal of said output current sampler is connected to the positive output terminal; said control circuit gets the magnitude of the current by said output current sampler which determines said boost converter's output current magnitude; thus said control circuit of said feed-forward compensation circuit II gets the phase information from the three-phase power supply, and turns off one of said bi-direction TRIACs to cut off the phase C in a-b interval, and through said bridge rectifier, the phase A and B are rectified to supply a DC voltage, which is then injected into said boost converter; it turns off another said bi-direction TRIACs to cut off the phase A in b-c interval and through said bridge rectifier, the phase C and B are rectified to supply a DC voltage, which is then injected into said boost converter; it turns off the third bi-direction TRIAC to cut off the phase B in c-d interval and through the bridge rectifier, the phase C and A are rectified to supply a DC voltage, which is then injected into the boost converter . . . , it turns off one bi-direction TRIAC to cut off the phase B in l-m interval and through the bridge rectifier, the phase A and C are rectified to supply a DC voltage, which is then injected into the boost converter; by repeating above steps, in each interval, said feed-forward compensation circuit II cuts off the higher one of the two phases which are at same polarity, and the rest two phases are rectified through the bridge rectifier; in this way the boost converter gives out suitable compulsive current waveform.

4. The parallel, feed-forward and compensation three-phase active power factor correction circuit as recited in claim 2, wherein the bi-direction switches in said feed-forward compensation circuit II are bi-direction TRIACs; said rectifier circuit is a bridge rectifier; the boost converter is a flyback type converter comprising IGBT switching transistors, a transformer, and diodes; the phases A, B and C of said three-phase power supply are connected with the input terminals of said three-phase bridge in said primary rectifier circuit I; the two output terminals of said three-phase bridge are in parallel with said filter capacitor and then connected to the output; said bi-direction TRIACs in said feed-forward compensation circuit II are connected to the phases A, B and C respectively; the three output terminals of said bi-direction TRIACs are connected to the inputs of said bridge rectifier in said feed forward compensation circuit II; the positive output terminal of said bridge rectifier is connected to one of the input terminals of the first coil of said transformer; another input terminal of the first coil is connected to the collector of said switching transistor; and the emitter is connected to the negative terminal of said bridge rectifier; the negative terminal of said diode is connected with the positive output terminal, its positive terminal is connected to one of the terminals of the second coil; the other terminal of the second coil is connected to the negative output terminal; said control circuit comprises a toggle circuit, three phase detect terminals, three control terminals of the bi-direction switches and an output current detect terminal; the toggle circuit is connected to the gate of the switching transistor; said three phase detect terminals are connected to said phases A, B, C of said three-phase power supply respectively; said three control terminals of bi-direction switches are connected with said control terminals of said bi-direction TRIACs; said output current detect terminal of said control circuit is connected to one terminal of said output current sampler; the other terminal of said output current sampler is connected to the positive output terminal; said control circuit gets the output current's magnitude through the output current sampler to determine the magnitude of the output current of the boost converter.

* * * * *